United States Patent [19]
Fujiwara et al.

[11] Patent Number: 5,795,080
[45] Date of Patent: Aug. 18, 1998

[54] NEEDLE BEARING RETAINER AND A NEEDLE BEARING

[75] Inventors: Yoshitsugu Fujiwara, Kishiwada; Hirotsugu Okuse, Chofu; Masahiro Noguchi, Fussa, all of Japan

[73] Assignee: Koyo Seiko Co., Ltd., Osaka, Japan

[21] Appl. No.: 593,872

[22] Filed: Jan. 30, 1996

[30] Foreign Application Priority Data

Jan. 30, 1995 [JP] Japan ................. 7-012741
Jan. 24, 1996 [JP] Japan ................. 8-009994

[51] Int. Cl.⁶ ................................................. F16C 33/46
[52] U.S. Cl. ................................................. 384/580
[58] Field of Search ..................... 384/580, 575, 384/576, 572, 578

[56] References Cited

U.S. PATENT DOCUMENTS 3,228,090  1/1966  Schaeffler et al.
4,623,270  11/1986 Olschewski et al. ............ 384/580
4,952,079  8/1990  Lingner ............................ 384/580
4,978,237  12/1990 Motohashi et al. ............... 384/580

FOREIGN PATENT DOCUMENTS 61-119816  6/1986  Japan.

*Primary Examiner*—Lenard A. Footland
*Attorney, Agent, or Firm*—Birch, Stewart, Kolasch & Birch, LLP

[57] ABSTRACT

A retainer for a needle bearing has an improved durability owing to the improved strength of its stay portions at the roots thereof, and an improved lubricating property. The retainer 10 is made by forming a plurality of longitudinally spaced apart pockets 11 for needle rollers in a strip of material, bending it into a cylindrical shape and joining its butt ends together. Every two adjoining pockets 11 define therebetween a stay portion 13 having a pair of axially extending sides S which are substantially parallel to each other. Every two adjoining stay portions 13 have between their radially inner ends a distance L1 which is smaller than the diameter of each needle roller 9f. Each stay portion 13 has a pair of protrusions 14 extending from its axially middle and radially outer part to the centers of two adjoining pockets 11, and the protrusions 14 in each pocket 11 have therebetween a distance L2 which is smaller than the diameter of the needle roller 9. Each protrusion 14 has a beveled surface 15 formed along its radially inner edge and adapted to make surface contact with the needle roller 9 in each pocket 11.

9 Claims, 9 Drawing Sheets

NEEDLE BEARING RETAINER AND A NEEDLE BEARING

BACKGROUND OF THE INVENTION

1. Field of the Invention

This invention relates to a retainer for a needle bearing and a needle bearing having such a retainer.

2. Description of Prior Art

A retainer in a needle bearing generally holds a single needle roller in each pocket. There is also known a retainer of the type which holds two needle rollers in each pocket, so that an increased total number of rollers in the retainer may give an improved load resistance (see Japanese Patent Application KOKAI No. Sho 61-119816).

Figure 15:
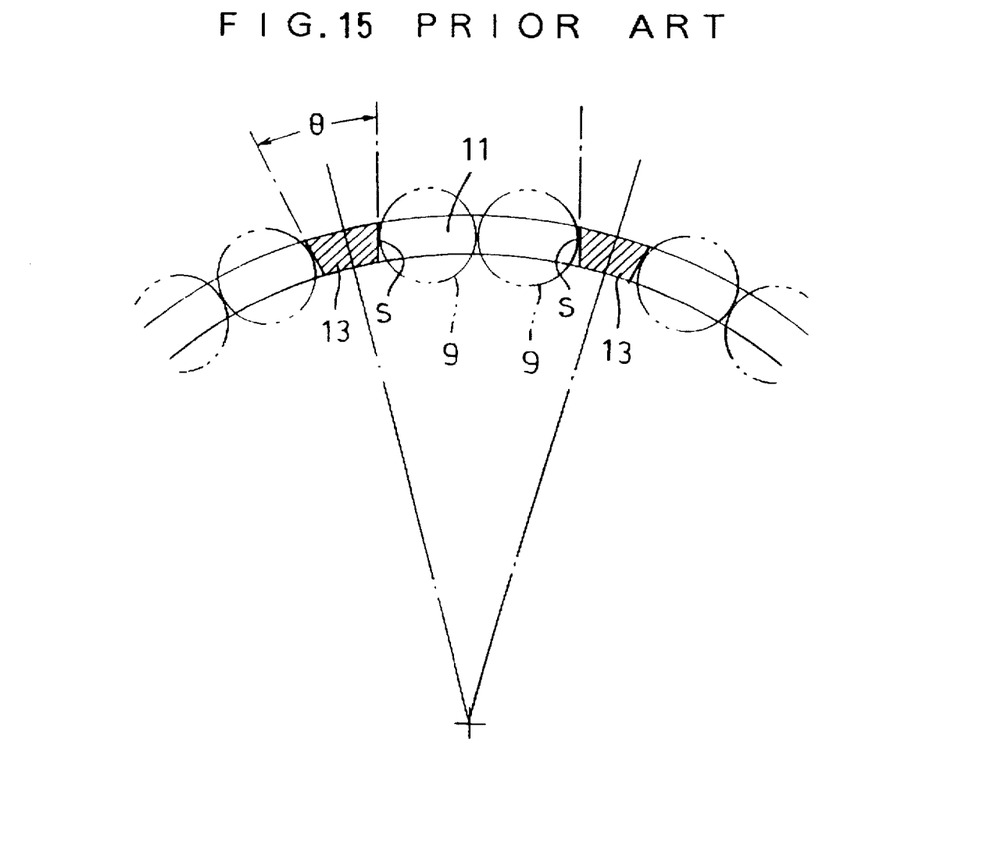
FIG. 15 is a front elevational view, partly in section, of a part of a known retainer.
Figure 16:
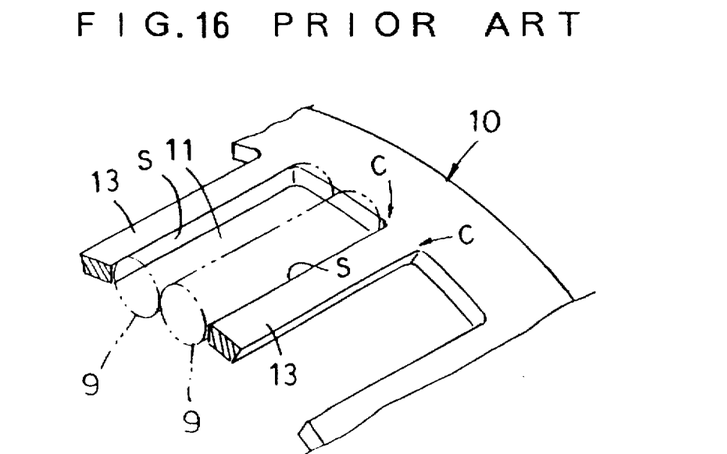
FIG. 16 is a perspective view of a part of the known retainer.

A retainer of the latter type is shown by way of example in FIGS. 15 and 16. As shown therein, the retainer 10 holding two needle rollers 9 in each pocket 11 has a pair of circumferentially spaced apart and parallel inner sides S facing each other and defining each pocket 11, and each stay portion 13 has a fan-shaped cross section defining a considerably small center angle θ making a large difference between the outer circumferential width of the stay portion 13 and its inner circumferential width.

This is due to a method which has usually been employed for forming the pockets 11. When the retainer 10 is made, the pockets 11 are cut in a cylindrical material diametrically thereof so as to be aligned with its center, and the stay portion between every two circumferentially adjoining pockets has, therefore, a gradually decreasing width toward the center of the retainer.

The known retainer 10 for a needle bearing as described above can be said to be lower in strength along the inner circumference of each stay portion 13 than along its outer circumference, since each stay portion has a fan shape defining a small center angle. It is, therefore, likely that, if a large load acts upon any stay portion 13 as a result of its collision or friction with the rotating needle rollers 9, a heavy concentration of stress may tend to occur in the roots of the stay portion 13, or its axial ends, particularly along its inner circumference and cause it to crack at the corners C of the axial ends of the pockets.

There is also known a retainer in which the stay portion between every two circumferentially adjoining pockets has a pair of opposite sides which are substantially parallel to each other, as shown in Japanese Patent Publication No. Sho 41-21242. This arrangement gives an improved strength to the roots of the stay portions and makes it possible to avoid the cracking thereof, as a heavy concentration of stress is unlikely to occur to the roots of any stay portion, or its axial ends, particularly along its inner circumference even if a large load may act upon the stay portion as a result of its collision or friction with the rotating needle rollers. This retainer holds a single needle roller in each pocket. This retainer is made by cutting appropriately spaced apart pockets for needle rollers in a strip of material longitudinally thereof, bending the strip into a cylindrical shape and joining the butt ends thereof. Every two circumferentially adjoining stay portions in this retainer have between their radially inner ends a distance which is smaller than the diameter of the needle roller, while each stay portion has protrusions extending from its axially middle and radially outer part toward the centers of the adjoining pockets and the protrusions in each pocket have therebetween a distance which is smaller than the diameter of the needle roller, so that no needle roller may come off any pocket radially inwardly or outwardly thereof.

As the protrusions are rectangular in cross section, however, they are likely to scrape a film of a lubricant off the outer peripheral surfaces of the needle rollers, as the corners of their radially inner edges engage the rollers. Moreover, the retainer is likely to have a polygonal, or uneven shape, since the strip of material is difficult to bend smoothly at the circumferentially discontinuous stay portions when it is bent into a cylindrical shape. If the bearing is of the type in which the outer surface of the retainer is located along the inner surface of a track wheel, or housing in which the bearing is mounted, the radially outwardly projecting corners of the stay portions are likely to scrape a film of a lubricant off the inner surface of the track wheel. Thus, the bearing is likely to lower its lubricating property.

SUMMARY OF THE INVENTION

It is, therefore, a principal object of this invention to provide a retainer for a needle bearing which is improved in strength at the roots of its stay portions and thereby in durability, as well as imparting an improved lubricating property within the bearing.

Other and further objects, features and advantages of this invention will appear more fully from the following description.

The above object is attained by a retainer for a needle bearing which comprises a strip of material having a plurality of longitudinally spaced apart pockets formed therein for holding needle rollers, bent into a cylindrical shape and joined at the butt ends thereof, every two circumferentially adjoining pockets defining therebetween a stay portion having a pair of opposite sides which are substantially parallel to each other, every two circumferentially adjoining stay portions having between their radially inner ends a distance which is smaller than the diameter of each needle roller, each stay portion having protrusions extending from its axially middle and radially outer part toward the centers of the adjoining pockets, the protrusions in each pocket having therebetween a distance which is smaller than the diameter of the needle roller, each of the protrusions in each pocket having along its radially inner edge a tapered surface making surface contact with the needle roller in the pocket.

Each stay portion preferably has an arcuate radially outer surface having its center of curvature at the longitudinal axis of the retainer.

According to this invention, there is also provided a needle bearing including a retainer as defined above, and holding a plurality of circumferentially juxtaposed needle rollers in each pocket.

The needle bearing is interposed between a planetary rotor and a shaft supporting it.

Each stay portion in the retainer of this invention has a radially inner width substantially equal to its radially outer width, and thereby an improved strength along its inner circumference. Therefore, even if a large load may act upon any stay portion as a result of its collision or friction with the rotating needle roller, it is unlikely to cause the stay portion to crack at the roots, or axial ends thereof, particularly along its inner circumference.

The protrusions formed on the stay portions for holding the needle rollers against detachment have a tapered or beveled radially inner edge making surface contact with the needle roller, and do not, therefore, scrape a film of a lubricant off its outer peripheral surface.

The arcuate radially outer surfaces of the stay portions do not scrape a film of a lubricant off the inner surface of a track wheel, or housing along which the outer surface of the retainer is located.

Each pocket is preferably provided with a passage which forces a lubricant into the pocket to impart an improved lubricating property.

The needle bearing of this invention holds an increased number of needle rollers and can maintain stability in performance for a long period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The invention will now be described in detail with reference to its embodiments shown in FIGS. 1 to 14. Reference is first made to FIGS. 1 to 5 showing a retainer embodying this invention. The retainer 10 is made by forming a plurality of longitudinally spaced apart pockets for needle rollers in a strip of material, bending the strip into a cylindrical shape and joining the butt ends thereof, as will hereinafter be described in further detail.

Figure 1:
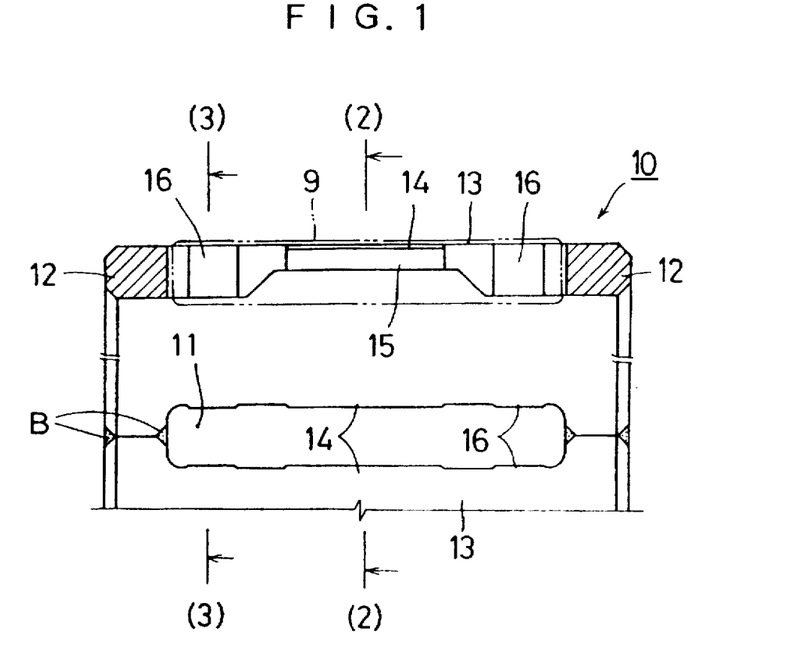
FIG. 1 is a side elevational view, partly in section, of a needle bearing retainer embodying this invention.

The retainer 10 has a plurality of circumferentially spaced apart pockets 11 each adapted to hold a needle roller 9 therein. The retainer 10 has a stay portion 13 formed between every two circumferentially adjoining pockets 11, and connecting a pair of annular portions 12 at the axial ends thereof.

Figure 2:
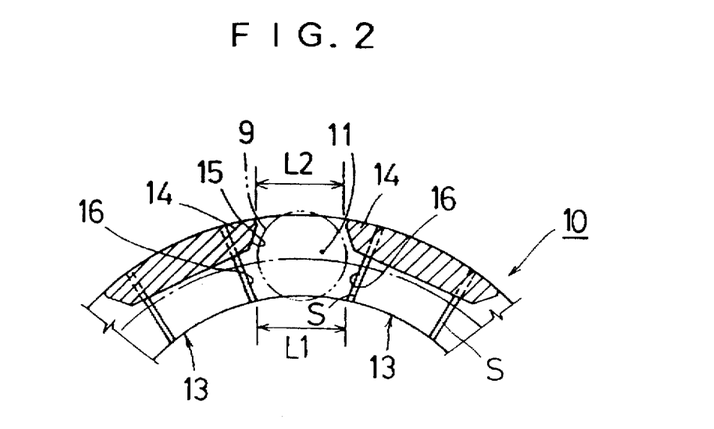
FIG. 2 is a sectional view taken along the line (2)—(2) of FIG. 1.
Figure 3:
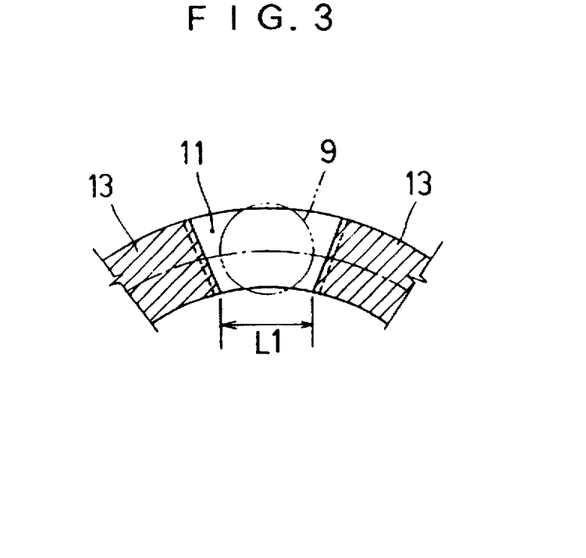
FIG. 3 is a sectional view taken along the line (3)—(3) of FIG. 1.
Figure 4:
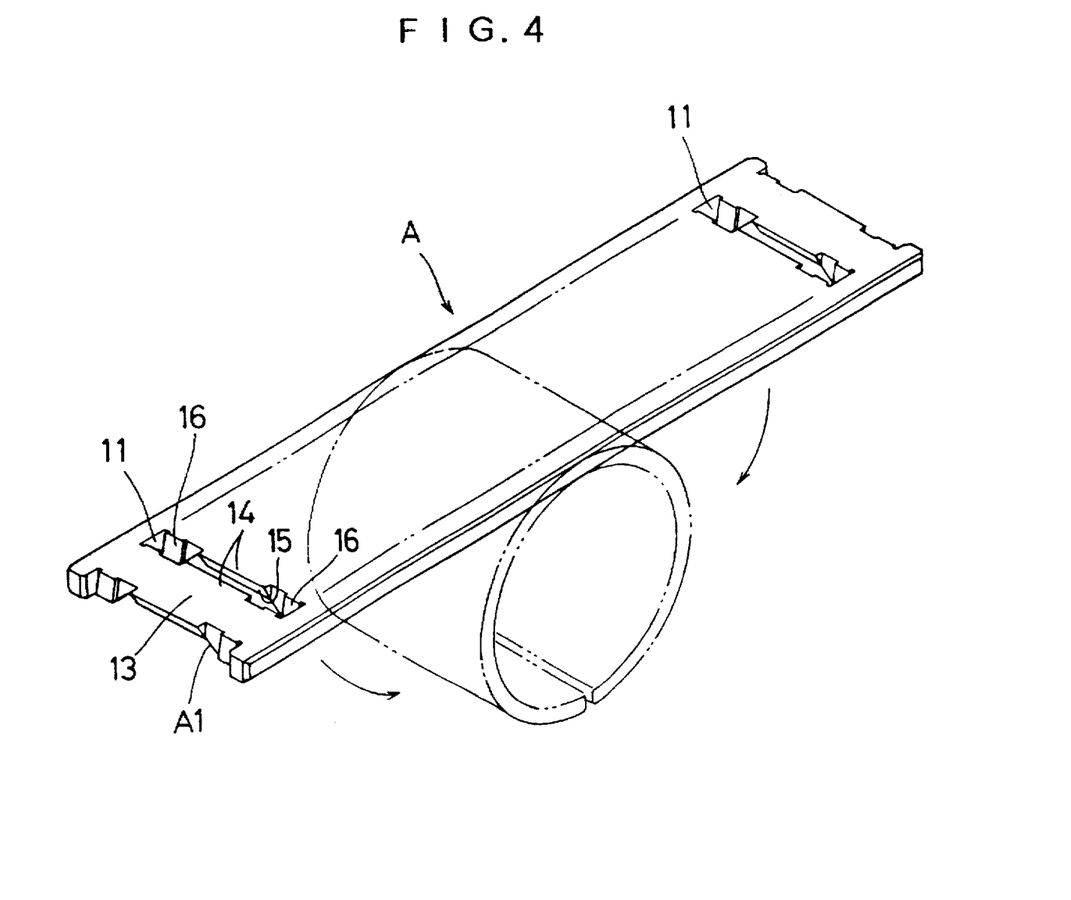
FIG. 4 is a perspective view showing a process for making the retainer.
Figure 5:
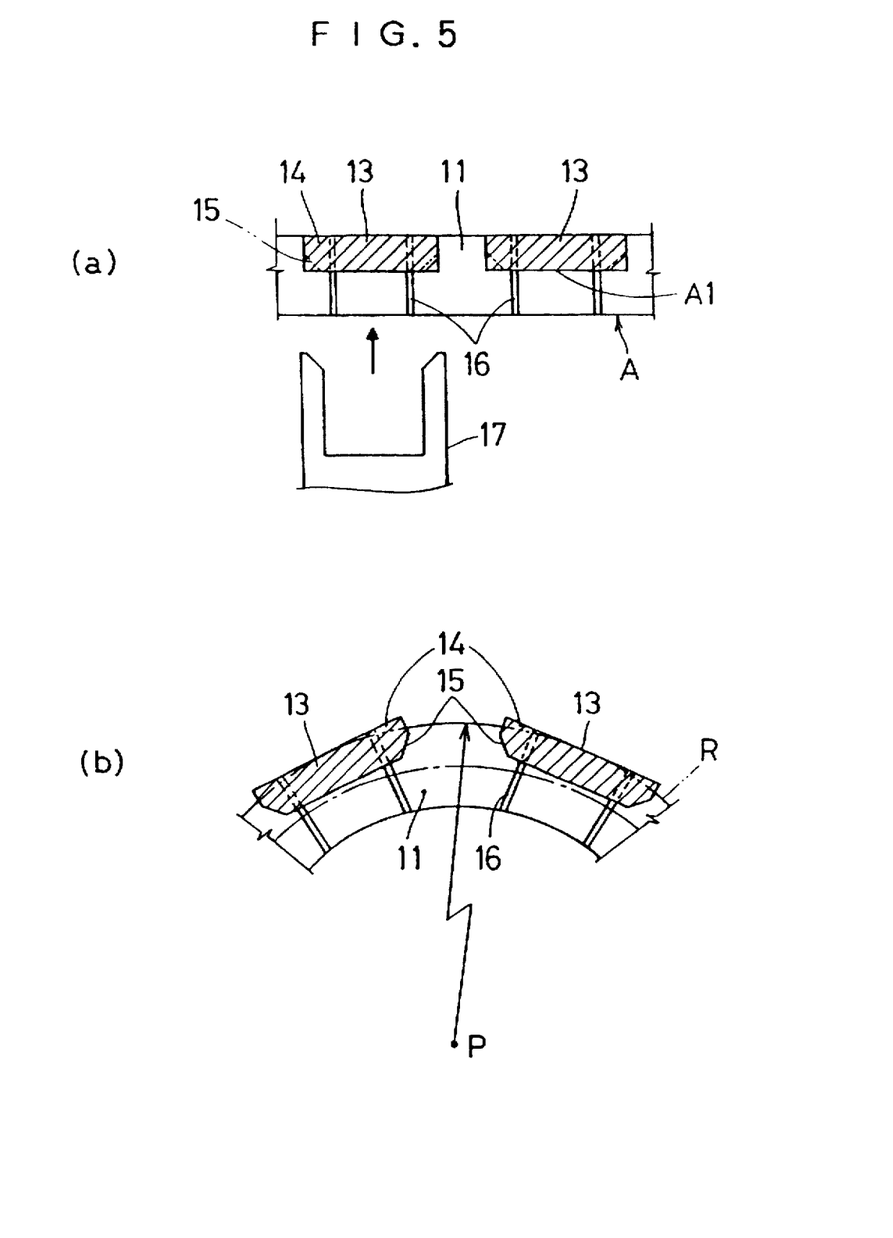
FIGS. 5(a) and 5(b) are sectional views showing a step in the process for making the retainer.

Each stay portion 13 has a pair of opposite sides S which are parallel, or substantially parallel to each other, and it has an outer circumferential width and an inner circumferential width which are substantially equal to each other, and a substantially rectangular shape in cross section, as shown in FIG. 2. The shape of each stay portion 13 as described improves its strength along its inner circumference over its counterpart in any known device.

Every two circumferentially adjoining stay portions 13 have between their radially inner ends a distance L1 which is smaller than the diameter of the needle roller that the needle roller 9 may not radially inwardly come off the retainer. Each stay portion 13 has a pair of protrusions 14 extending from its axially middle and radially outer part toward the centers of two adjoining pockets 11, and the two protrusions 14 in each pocket 11 have therebetween a distance L2 which is smaller than the diameter of the needle roller 9, so that the needle roller 9 may not radially outwardly come off the retainer. Each protrusion 14 has a beveled surface tapered toward its radially inner edge, and adapted to make surface contact with the needle roller 9 in the pocket 11. The beveled surface is shown at 15. Each stay portion 13 also has a pair of slightly raised projections 16 adjacent to its axial ends, respectively.

Each stay portion 13 has an arcuate radially outer surface formed by grinding along an arc R having its center of curvature at the longitudinal axis P of the retainer 10 formed by bending a strip of material, so that the retainer 10 may, as a whole have a substantially circular outer surface.

The following is a brief description of a process for making the retainer 10: (1) A transversely middle groove A1 having an appropriate width is formed in the lower surface of a strip A of material, such as SPCD or other steel, along its entire length. (2) A plurality of pockets 11 are formed in the strip A at equal intervals along its length. A plurality of stay portions 13 and their protrusions 14 and projections 16 are simultaneously formed. (3) The stay portion 13 between every two pockets 11 adjoining each other along the length of the strip A is formed along the corner of each protrusion 14 with a beveled surface 15 by inserting a die 17 into the groove A1 and pressing the protrusions 14, as shown in FIG. 5(a). (4) The strip A is bent into a cylindrical shape, as shown by phantom lines in FIG. 4. It forms a polygonal or uneven shape, since the strip A is difficult to bend smoothly at the circumferentially discontinuous stay portions 13. (5) The butt ends of the cylindrically shaped strip A are welded together. The butt ends are formed at a pair of annular portions 12 extending between the axial ends of the pockets 11 and lie along the longitudinal centerline of a pocket, and each butt end has a beveled radially extending edge, so that a weld bead B may be held between the beveled edges of the butt ends (6). Each stay portion 13 has its radially outer surface ground along an arc R having its center of curvature at the longitudinal axis p of the retainer, so that the retainer may, as a whole, have a substantially circular outer surface, as shown in FIG. 5(b).

Then, the retainer is subjected to hardening treatment (carburization), surface treatment (shot blasting), etc. as required.

As the retainer 10 has a beveled surface 15 formed along the radially inner edge of each protrusion 14 on each stay portion 13, and adapted to make surface contact with the needle roller 9, there is no possibility of a film of a lubricant being scraped off the outer surface of any needle roller 9. As each stay portion 13 has an arcuately shaped radially outer surface, there is no possibility of a film of a lubricant being scraped off the inner surface of a track wheel, or housing along which the outer surface of the retainer 10 is situated. Thus, the retainer 10 can be used to make a needle bearing having an improved lubricating property and an improved life, or resistance to failure.

The protrusion 14 and the two projections 16 formed on each side of each stay portion 13 are axially spaced apart from one another to form recesses defining passages for a lubricant. These passages ensure the good lubrication of the needle roller 9 in each pocket 11.

Figure 6:
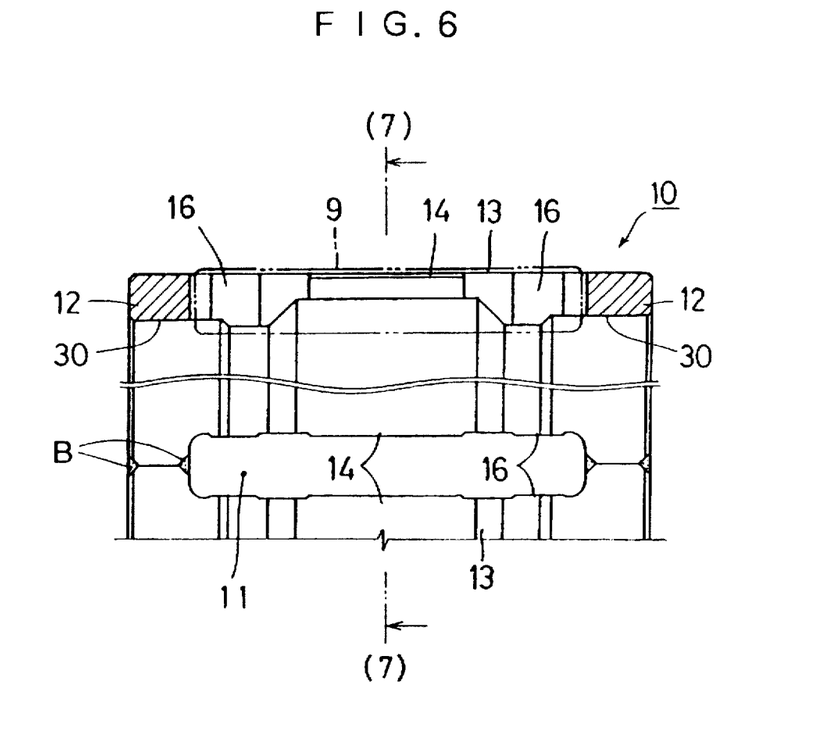
FIG. 6 is a side elevational view, partly in section of a different form of a needle bearing retainer embodying this invention.
Figure 7:
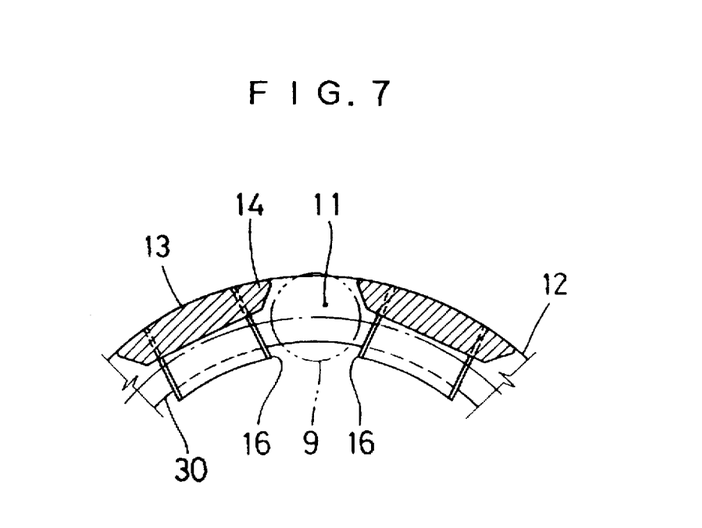
FIG. 7 is a sectional view taken along the line (7)—(7) of FIG. 6.

The following (a) to (d) is a description of different types of arrangements which can be employed to ensure the effective supply of a lubricant into each pocket 11 in the retainer 10:

(a) FIGS. 6 and 7 show a pair of circumferentially extending grooves 30 formed in the inner surface of the retainer 10 at its axial ends, respectively. Each groove 30 extends across the whole width of one of the annular portions 12 and along a part of each stay portion 13 adjacent to one end thereof. The grooves 30 facilitate the flow of a lubricant from the vicinity of the inner periphery of the retainer 10 into the pockets 11.

Figure 8:
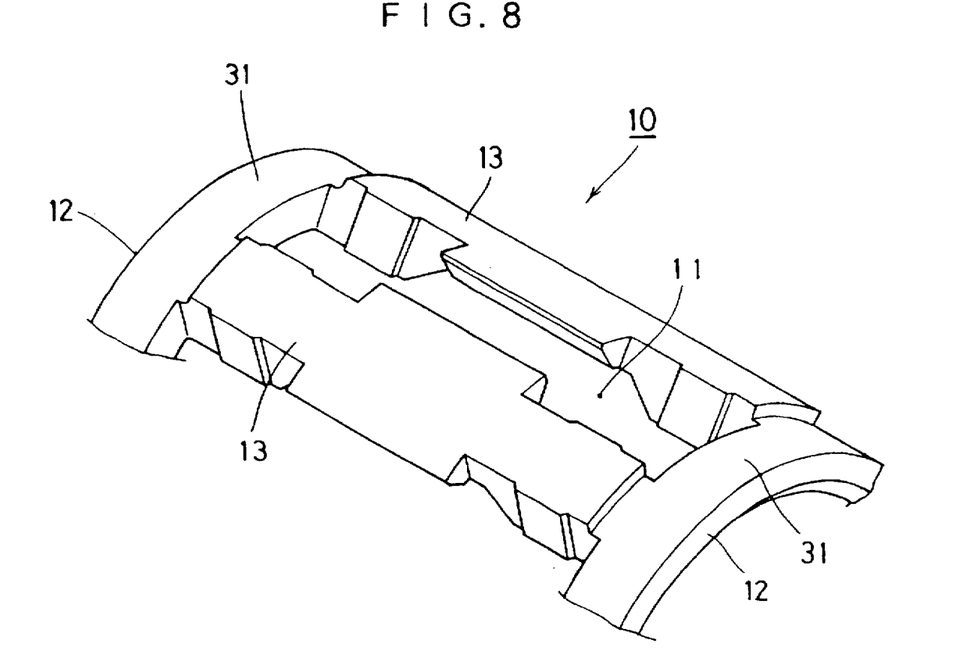
FIG. 8 is a perspective view showing a different form of a needle bearing retainer embodying this invention.
Figure 10:
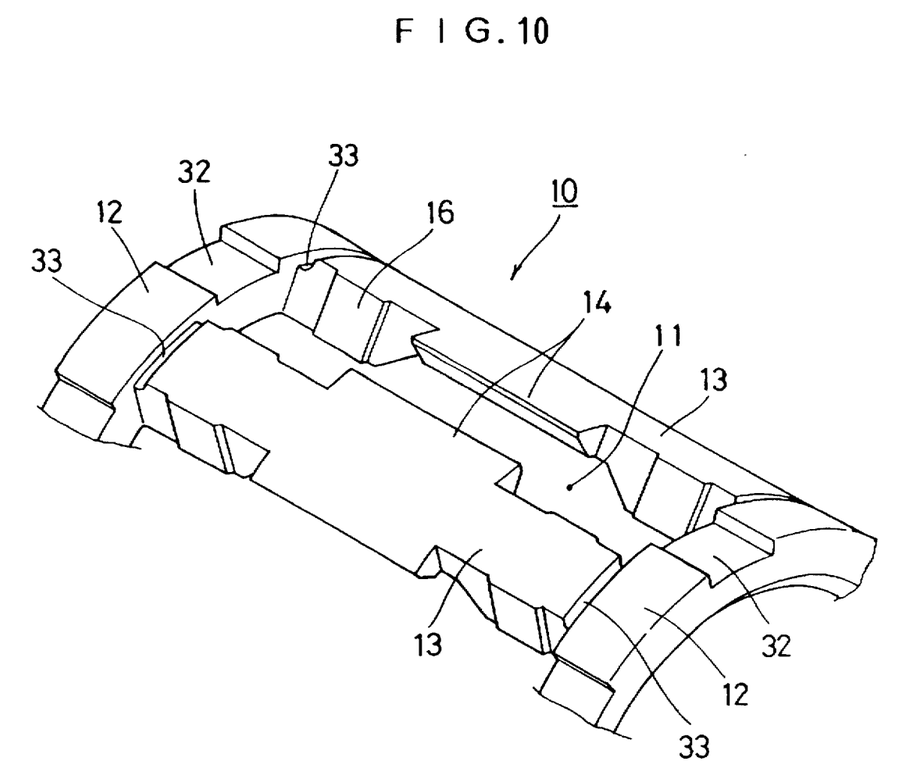
FIG. 10 is a perspective view showing a different form of a needle bearing retainer embodying this invention.

(b) FIG. 10 shows, in addition to grooves 30 and 31 as shown in FIG. 8, a pair of circumferentially extending grooves 33 formed between the annular portions 12, respectively, and the stay portions 13, and connected with the grooves 31 and 32. The lubricant flowing into one pocket through the grooves 31 is allowed to flow into other pockets 11 through the grooves 33 and 32.

Figure 9:
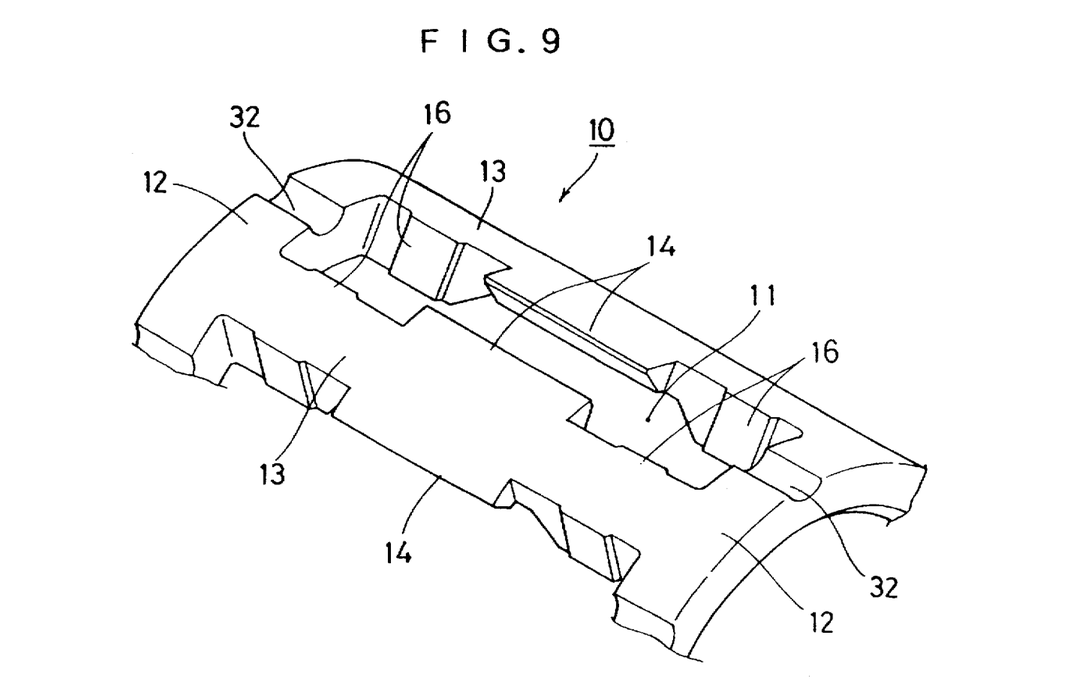
FIG. 9 is a perspective view showing a different form of a needle bearing retainer embodying this invention.

(c) FIG. 9 shows a pair of axially extending grooves 32 formed in the outer surfaces of the annular portions 12, respectively, of the retainer 10 and axially aligned with each pocket 11. The grooves 32 facilitate the flow of a lubricant from the vicinity of the outer periphery of the retainer 10 into the pockets 11. The grooves 32 are shown as having a partly circular cross section, but may alternatively have any other cross section.

(d) FIG. 10 shows a pair of circumferentially extending grooves 32 formed in the outer surface of each stay portion 13 at its axial ends, or roots, respectively, in addition to grooves 31 as shown in FIG. 8. The grooves 31 are shown as having a substantially rectangular cross section, but may alternatively have any other cross section. The grooves 32 facilitate the flow of a lubricant from one pocket 11 to another situated behind it as viewed in the direction of rotation of the retainer. The circulation of the lubricant from one pocket 11 to another can prevent its flow out of the retainer.

The arrangement as described at (a) above can be combined with any of the arrangements as described at (b) to (d). Moreover, each of the grooves 30 to 33 serves not only as a lubricant passage, but also as a storage space for the lubricant. Therefore, it is advisable to employ at least the arrangement as described at (a) if the retainer 10 least any of the arrangements as described at (b) to (d) if it is employed for guiding a device surrounding it, so that in the case of e.g. a heavy movement of the retainer, a lubricant may be easy to hold between the sliding surfaces to improve their lubrication and thereby protect them against wear and seizure.

Figure 11:
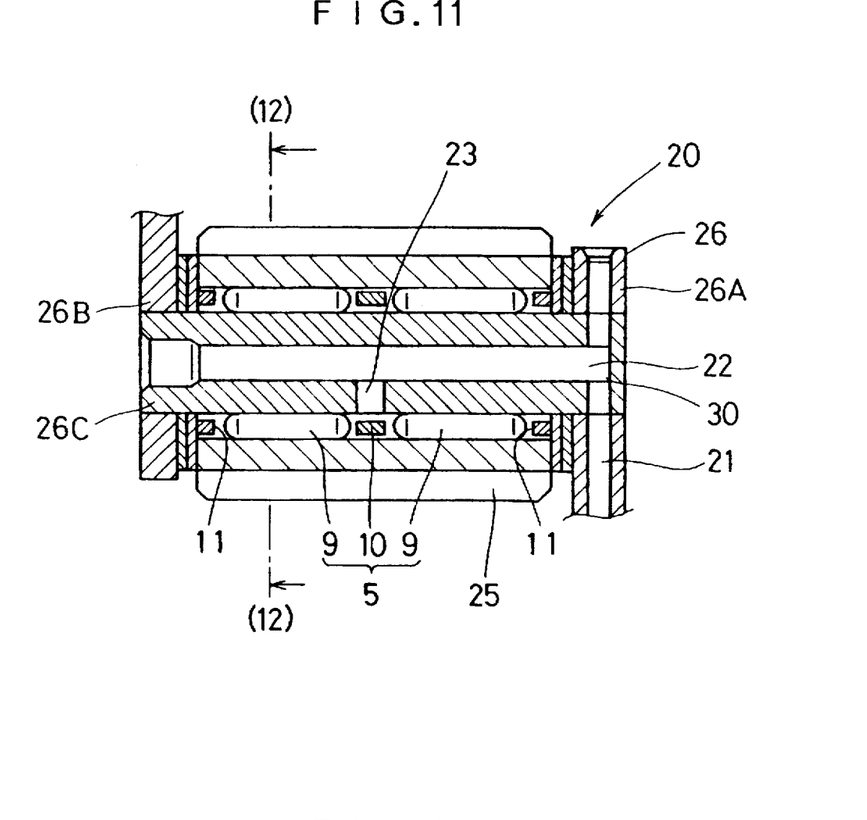
FIG. 11 is a side elevational view, partly in section, of a part of an automatic transmission for a vehicle which includes a needle bearing embodying this invention.
Figure 12:
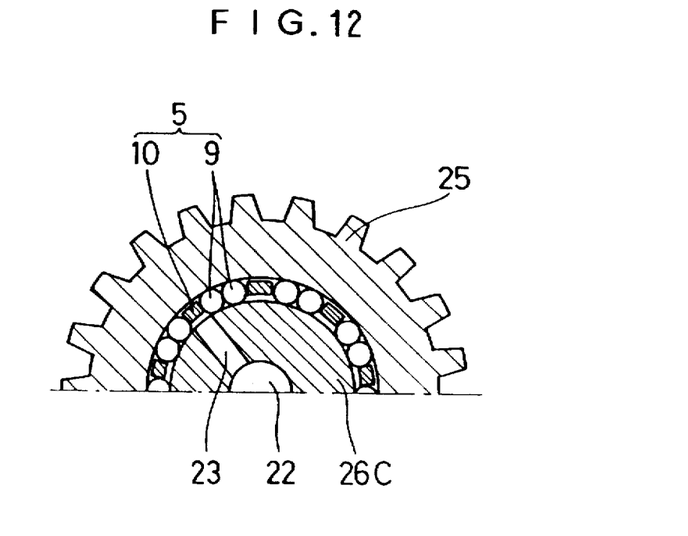
FIG. 12 is a sectional view taken along the line (12)—(12) of FIG. 11.
Figure 13:
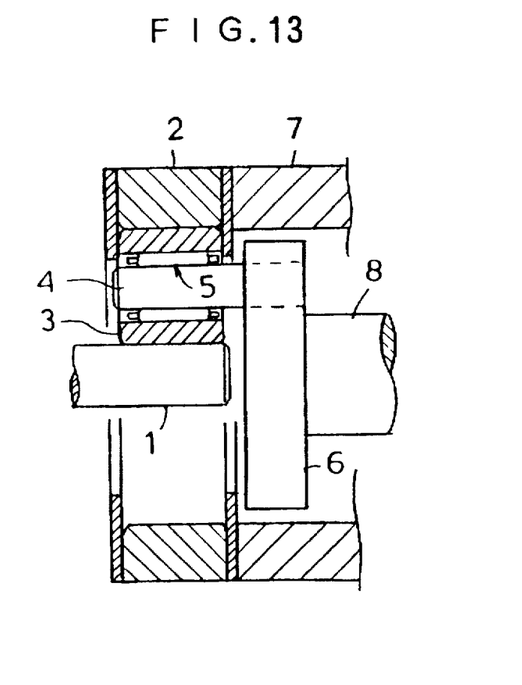
FIG. 13 is a side elevational view, partly in section, of a planetary roller type power transmission including a needle bearing embodying this invention.
Figure 14:
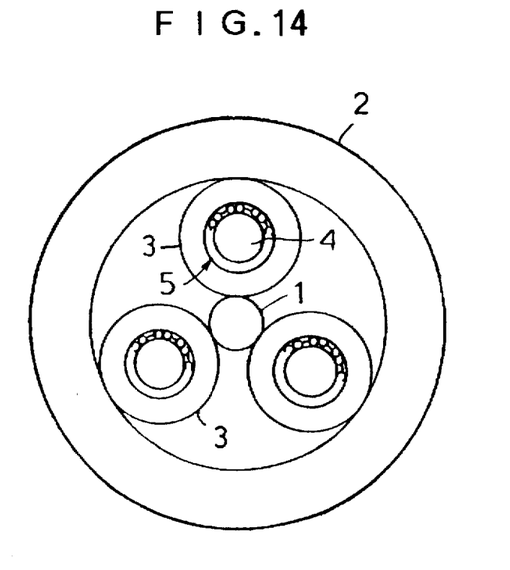
FIG. 14 is a front elevational view of the planetary roller type power transmission shown in FIG. 13.

The foregoing description of different forms of embodiments is not intended for limiting the scope of this invention, but a variety of other applications or modifications may be made without departing from the scope of this invention. (1) Such modifications include a retainer in which each pocket 11 holds two circumferentially juxtaposed needle rollers 9, and a retainer in which each pocket 11 consists of two axially aligned pockets. These arrangements enable the retainer to hold a large number of needle rollers 9 for its circumferential length and thereby provide a bearing having an improved load bearing capacity. Although these arrangements may tend to cause a large load to act upon the stay portions 13 as a result of their collision or friction with the rotating needle rollers 9, cracking is unlikely to occur to the roots, or axial ends of any stay portion 13, particularly along its inner circumference, and stability in performance can be maintained for a long period of time. (2) The retainer 10 as described above can be used to make a needle bearing (cage and roller) in combination with needle rollers 9, or a needle bearing in combination with needle rollers 9 and inner and outer races. The former type of bearing is, above all, suitable for use in supporting a planetary gear in a planetary gear type power transmission employed as an automatic transmission for a vehicle as shown in FIGS. 11 and 12, or in supporting a planetary roller in a planetary roller type power transmission as shown in FIGS. 13 and 14. It is also useful in supporting a gear in a speed changer, or the like.

Description is first made of the automatic transmission for a vehicle as shown in FIGS. 11 and 12. FIG. 11 shows a planetary gear 20, a planetary pinion 25 and a carrier 26. The carrier 26 supports the planetary pinion 25 rotatably, and comprises a main body 26A in the form of a cage having a sidewall and three or four equally spaced apart cylindrical portions having windows, a carrier cover 26B welded to the ends of the cylindrical portions of the main body 26A and defining another sidewall for the main body 26A, and a carrier shaft 26C having a pair of ends fitted in the holes formed in the main body 26A and the cover 26B, respectively.

A needle bearing 5 comprising a retainer 10 and needle rollers 9 is interposed between the planetary pinion 25 and the carrier shaft 26C. The retainer 10 has a plurality of pairs of axially aligned pockets 11 and each pocket 11 holds two circumferentially juxtaposed needle rollers 9, so that the retainer holds a large number of needle rollers 9 for its circumferential length and the bearing has a correspondingly improved load bearing capacity.

The carrier 26 has a lubricant passage 30. The lubricant passage 30 comprises a radially extending hole 21 formed in the sidewall of the main body 26A and having a central end connected to a source of lubricant supply, an axial hole 22 formed along the longitudinal axis of the carrier shaft 26C and connected to the radially extending hole 21, and a radially extending hole 23 formed in the midportion of the carrier shaft 26C and connected to the axial hole 22. The lubricant passage 30 provides a smooth lubricant supply to the needle rollers 9 in the needle bearing 5, since the protrusion 14 and the two projections 16 formed on each side of each stay portion 13 are axially spaced apart from one another and thereby define recesses serving as the lubricant passages as described before.

Description will now be made of the planetary roller type power transmission (or traction drive) as shown in FIGS. 13 and 14. The traction drive comprises a sun shaft 1, a stationary ring 2 surrounding it in a concentric relation, a plurality of (or three in FIG. 14) planetary rollers (or rotors) 3 contacting the outer periphery of the sun shaft 1 and the inner periphery of the stationary ring 2, a carrier pin 4 inserted as a supporting shaft in the axial bore of each planetary roller 3, a circular carrier plate 6 from which the carrier pins 4 extend, and a shaft 8 connected to the carrier plate 6 at its center and supported in a cylindrical housing 7 by a bearing not shown. A needle bearing 5 comprising a retainer 10 and needle rollers 9 is interposed between each planetary roller 3 and the supporting shaft 4 inserted therein. The needle bearing 5 has a plurality of axially single pockets 11 each holding two circumferentially juxtaposed needle rollers 9, and holds a large number of needle rollers 9 for its circumferential length and thereby has an improved load bearing capacity.

The device serves as a speed reducer if the sun shaft 1 is employed as an input shaft, and the shaft 8 as an output shaft, while it serves as a speed increaser if the shaft 8 is employed as an input shaft, and the sun shaft 1 as an output shaft.

The needle bearing retainer of this invention has an improved durability owing to the improved strength of its stay portions achieved by an effective improvement in their cross sectional shape, while there is no fear of any lubricant film being scraped off the outer surface of any needle roller by the protrusions formed on the stay portions for holding the needle rollers against detachment.

If the retainer of this invention has an arcuately shaped outer surface on each of its stay portions, there is no fear of any lubricant film being scraped off the inner surface of any track wheel, or housing along which the outer surface of the retainer is situated. These arrangements can be combined to achieve an improved life, or resistance to failure.

The needle bearing of this invention has outstandingly high levels of load bearing capacity, lubricating property and durability owing to an increased number of needle rollers held by the retainer of this invention.

The needle bearing of this invention is suitable for supporting a planetary rotor rotating at a high speed, and can effectively be used to make a planetary rotor type power transmission of high durability.

While the invention has been particularly shown and described with reference to the preferred embodiments thereof, it will be understood by those skilled in the art that the foregoing and other changes in form and details can be made therein without departing from the spirit and scope of the invention.

What is claimed is:

1. A needle roller bearing retainer comprising:

a cylindrical member with an inner circumference and an outer circumference;

a plurality of pockets disposed circumferentially in said cylindrical member, each pocket includes a longitudinal center line;

a plurality of stay portions, each stay portion is disposed between two pockets of said plurality of said pockets;

a plurality of pairs of projections disposed in each pocket, each projection extends from a stay portion towards a longitudinal center line and includes an angled planar wall portion, each pair of projections defines a tapered opening in each pocket which narrows in a direction towards said inner circumference, each projection at said inner circumference is spaced apart from a respective opposing projection for a predetermined first distance; and a pair of protrusions disposed in each pocket and between at least two pairs of projections, each protrusion extends from a stay portion towards a longitudinal center line and includes a beveled planar wall portion adapted to contact a needle roller, each pair of protrusions defines a first tapered opening in each pocket which widens in a direction towards said inner circumference, each protrusion at said outer circumference is spaced apart from a respective opposing projection for a predetermined second distance, whereby each stay portion substantially increases strength of said retainer while said protrusions substantially reduce scraping of lubricant off of a needle roller.

2. The retainer as set forth in claim 1, wherein each of said stay potions has an arcuately shaped radially outer surface having its center of curvature at the longitudinal axis of the retainer.

3. The retainer as set forth in claim 2, wherein each of said pockets holds a plurality of circumferentially juxtaposed needle rollers.

4. The retainer as set forth in claim 2, said retainer having a plurality of lubricant passages connected with said pockets.

5. The retainer as set forth in claim 1, said retainer having a plurality of lubricant passages connected with said pockets.

6. The retainer a set forth in claim 5, wherein each of said pockets holds a plurality of circumferentially juxtaposed needle rollers.

7. The retainer as set forth in claim 1, wherein each of said pockets holds a plurality of circumferentially juxtaposed need rollers.

8. The retainer as set forth in claim 7, said bearing being interposed between a planetary rotor and a shaft supporting it.

9. The retainer as set forth in claim 1, wherein said first predetermined distance and second predetermined distance are less than a diameter of a needle roller.

* * * * *